3,357,448
CONSTANT FLOW VALVE
Thomas B. Martin, c/o Micro-Pump Corp., P.O. Box 392, Danville, Calif. 94526
Filed June 14, 1965, Ser. No. 463,556
5 Claims. (Cl. 137—501)

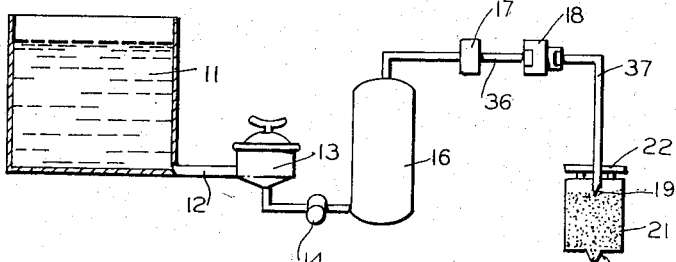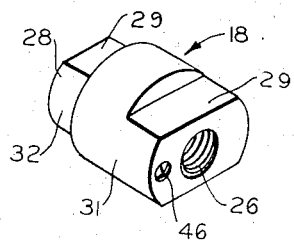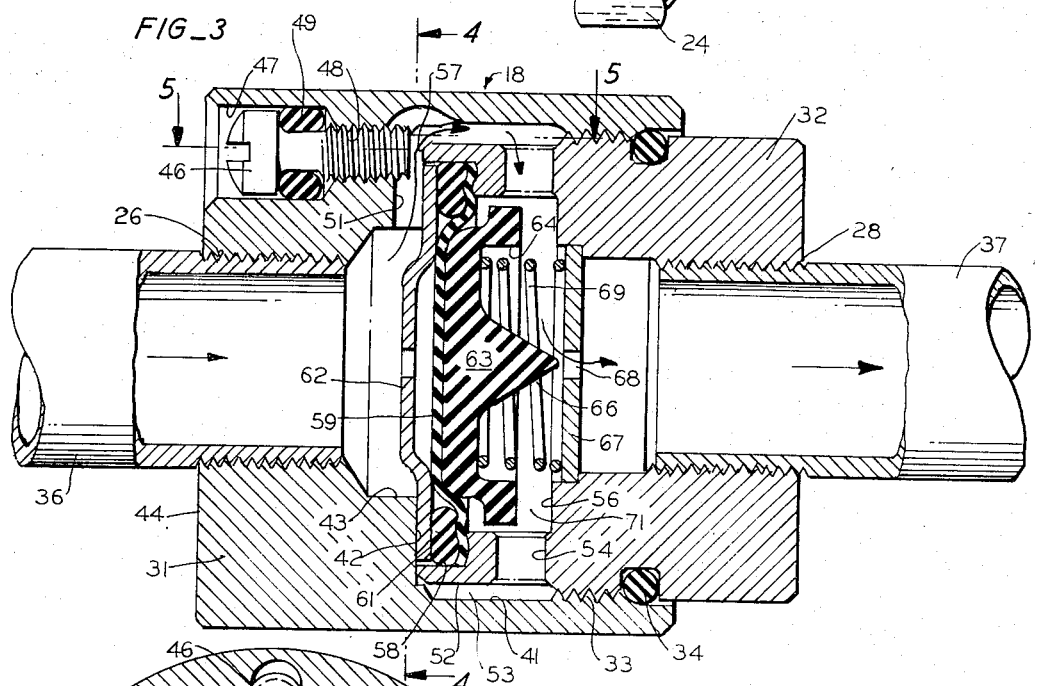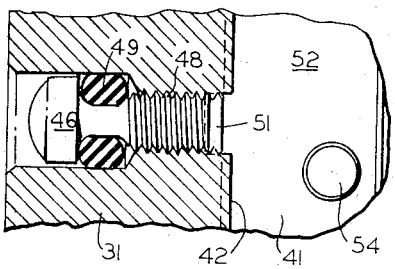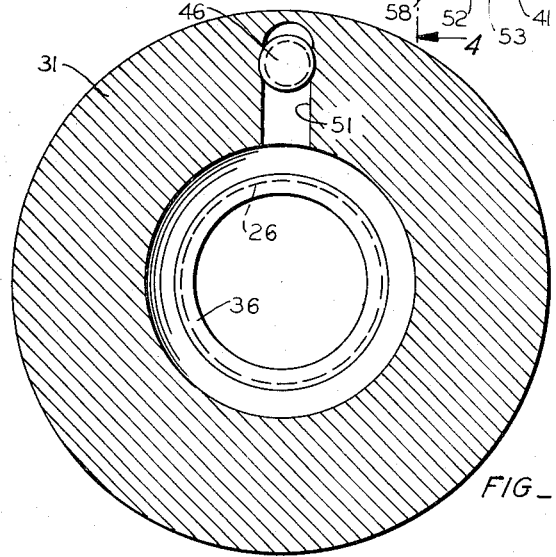
Dec. 12, 1967     T. B. MARTIN     3,357,448
CONSTANT FLOW VALVE
Filed June 14, 1965
INVENTOR.
THOMAS B. MARTIN
BY
Julian Caplan
ATTORNEY United States Patent Office 3,357,448
Patented Dec. 12, 1967

ABSTRACT OF THE DISCLOSURE

A constant flow valve is provided for installations where either both inlet and back pressure are variable. The casing consists of two interfitting chambered parts which are assembled by axial movement and have inlet and outlet ports in line with said axis. An internal diaphragm between the chambers carries a block which, upon movement of the diaphragm varies the effective area of an orifice in a plate beyond the outlet chamber. A restricted flow passage between the two chambers bypasses the diaphragm. Flow through the by-pass may be adjusted.

This invention relates to a new and improved constant flow valve. More particularly, the invention relates to a small size valve which is simple in construction and is composed of parts which are easily and inexpensively manufactured.

The valve of the present invention is intended for uses where the pressure at the inlet or the back pressure at the outlet are variable or both. The valve compensates for such pressure variations so that the volume of flow through the valve remains constant. Further, adjustment is provided so that the volume may be changed as desired, the adjustment being performed by a screw which is readily accessible from the exterior.

A further advantage of the invention is the fact that the inlet and outlet of the valve are in line, whereas in other valves of this general type the outlet is at an angle with respect to the inlet.

With regard to the ease of manufacture of the valve, the parts hereinafter described in detail may be made from bar stock on an automatic screw machine (or if desired, castings or forgings can be substituted for bar stock), on a punch press, or on a plastic molding press. Hence, high-speed production and low-cost manufacture are achieved. Further, the valve is easily assembled.

A specific application for the valve is in coffeemaking equipment for aircraft. In such installation, hot water is pumped through a line in which the valve is installed into a container initially containing dry coffee grounds. After the water has passed through the coffee grounds it is dispensed into a container. It will be observed that in such an installation the intake pressure may be variable. Furthermore, the back pressure is variable since the coffee grounds, as they swell, create a resistance to flow. Hence, the invention is used to dispense a measured quantity of liquid from a variable pressure source against a variable back pressure in a fixed time interval. It will be understood, of course, that the valve has application in many other installations.

Other objects of the present invention will become apparent upon reading the following specification and referring to the accompanying drawings in which similar characters of reference represent corresponding parts in each of the several views.

In the drawings:

FIG. 1 is a schematic view of a coffee-making apparatus with which the present invention may be used.

FIG. 2 is a perspective view of the valve in accordance with this invention.

FIG. 3 is an enlarged vertical sectional view through the valve.

FIG. 4 is a further enlarged fragmentary sectional view taken subsantially along the line 4—4 of FIG. 3.

FIG. 5 is a fragmentary sectional view taken substantially along the line 5—5 of FIG. 3.

A specific installation in which the present invention is adapted is illustrated in FIG. 1, it being understood that the valve has application in other installations. As shown in FIG. 1, a water supply reservoir 11 is located in aircraft. Water is drawn from reservoir 11 through pipe 12 to a filter or strainer 13 and thence is forced by a gear pump or other suitable pump 14 through a heater tank 16 which heats the temperature nearly to boiling. From tank 16 the hot water passes through an on-off valve 17 to the flow control 18 which is hereinafter described in detail. Thence the hot water is forced through a discharge pipe 19 into a container 21 initially containing coffee grounds. Container 21 is sealed off at the top by cover 22 but at the bottom has a discharge spigot 23 which discharges the prepared coffee into a pot 24.

Directing attention now to FIG. 2 it will be seen that the valve 18 is a small size and has inlet and discharge ports 26, 28. Flats 29 may be formed on either end to facilitate installation. The housing of valve 18 consists of two external parts, an internally threaded part 31 at the inlet, and an externally threaded part 32, at the discharge end which are screwed together by means of threads 33 and are sealed by O-ring 34. Inlet pipe 36 leading from valve 17 is threaded into inlet port 26 and discharge pipe 37 leading to nozzle 19 is threaded into discharge port 28. Proceeding from the far end of part 31, immediately inside the threaded end 33 is an enlarged diameter chamber 41 which terminates in an annular shoulder 42. A restricted diameter tapering opening 43 leads to threaded inlet port 26. At one location in the inlet end 44 of part 31 is an adjustment screw 46 fitting into a counterbore 47 in the end of part 31 and threaded by means of thread 48 into part 31 and sealed therein by packing 49. As indicated by reference numeral 51, a channel 51 is formed in shoulder 42 communicating between chamber 43 and enlarged chamber 41. The inner end of screw 46 extends into the channel 51 and adjusts radial flow from chamber 43 into chamber 41 as hereinafter explained.

Part 32 inwardly of threaded portion 33 has a reduced external diameter 52 so that a passageway 53 exists between the wall of chamber 41 and diameter 52. A plurality of holes 54 are formed in part 32 communicating from passageway 53 into the internal chamber 56 at the inner end of part 32. The inner end 57 of part 32 is spaced from the inner end of screw 46 and the adjustment of screw 46 adjusts the space between end 57 and the end of the screw in channel 51 and thus regulates the flow into passage 53. The inner end of part 32 is formed with a counterbore 58 which receives diaphragm 59, seal 61 and apertured retaining plate 62. On the discharge side of diaphragm 59 is a fitting 63 formed with a peripheral cup 64 and a central cone 66. Orifice plate 67 formed with a central orifice 68 is located in counterbore 56 inward of port 28. Helical spring 69 is located inside cup 64 and bears against plate 67. Spring 69 functions to bias member 63 and diaphragm 59 away from plate 67. However, when the fitting 63 is forced toward the discharge end, cone 66 and orifice 68 cooperate to limit the flow of fluid through the valve.

In operation, a variable pressure may be applied to inlet port 26 through pipe 36 and a variable back pressure may also be applied to outlet port 28 from port 37. The flow through the valve is restricted from chamber 43 through opening 57, passage 53 and holes 54 into chamber 71 on the inlet side of orifice plate 67 depending upon the adjustment of screw 46. A pressure drop is caused by this first restriction inflow which drop increases when the flow increases and decreases when flow decreases. The drop results in higher pressure on the inlet side of diaphragm 59 and a corresponding lower pressure on the opposite side thereof. When the pressure differential overcomes the force of spring 69 the valve begins to function and cone 66 moves into orifice 68 to introduce a second restriction to flow. The second or variable restriction is regulated by the force of spring 69 to maintain a substantially constant pressure drop across the first or fixed restriction. Therefore flow through the fixed restriction, and correspondingly flow through the valve is substantially constant. Any variations in supply pressure or back pressure are met automatically by compensating changes in pressure drop in the second restriction. Choice of the preload of spring 69 determines the magnitude of pressure drop which must exist before the valve parts move.

When it is desired to change the rate of flow, adjustment of screw 46 varies the opening 57 in passage 53, thereby adjusting what has been termed the first or fixed restriction.

What is claimed is:

1. A valve comprising a casing, said casing having an inlet port at a first end, an inlet chamber inside said inlet port, and an outlet port at a second end, an outlet chamber inside said outlet port; a plate apertured to form an orifice fixed in said outlet chamber between said outlet chamber and said outlet port, a diaphragm mounted in said casing separating said inlet and outlet chambers, an orifice block mounted for movement with said diaphragm toward and away from said orifice to vary the effective area of said orifice, a spring biasing said orifice block away from said orifice, said casing formed with a restricted flow bypass around said diaphragm terminating in said outlet chamber upstream of said orifice, said casing formed with an inlet part including said inlet port and inlet chamber and an outlet part including said outlet port and outlet chamber fitting together, said diaphragm positioned across the inner end of said outlet part, the inner end of said outlet part fitting inside said inlet part with a passage around said inner end, said outlet port formed with apertures from said passage into said outlet chamber upstream of said plate, said inlet part and said inner end comprising said bypass.

2. A valve comprising a first and a second hollow casing part, said first part formed with an internal shoulder, said second part formed with an inner end dimensioned to fit inside said first part and to extend in close proximity to said internal shoulder, means for holding said parts together in assembled position, an inlet port in said first part, an outlet port in said second part, said ports axially aligned transverse to the plane of said shoulder, an inlet chamber in said first part inside said inlet port and on the side of said shoulder toward said inlet port, an outlet chamber in said second part spaced inside said outlet port, means forming an orifice between said outlet chamber and said inlet port, a diaphragm in proximity to said shoulder separating said inlet and outlet chambers, mounting means for said diaphragm compressed between the inner end of said second part and said shoulder when said parts are in assembled position, orifice blocking means mounted for movement with said diaphragm toward and away from said orifice to vary the effective area of said orifice, a spring biasing said blocking means away from said orifice, said casing parts formed with a restricted flow bypass from said inlet chamber around said diaphragm and into said outlet chamber upstream of said orifice.

3. The valve of claim 2 which further comprises means adjusting the flow through said by-pass to adjust rate of flow through said valve.

4. The valve of claim 2 which comprises a screw extending from the exterior of said valve into said by-pass to adjust flow through said by-pass to adjust rate of flow through said valve.

5. In combination in a coffeemaker, a water reservoir, pressure means for driving water under pressure from said reservoir, a valve according to claim 2 receiving discharge of said pressure means, and a container for coffee grounds receiving a constant flow of water from said valve, said container having an opening to discharge coffee.

References Cited
UNITED STATES PATENTS

| | | | |
|---|---|---|---|
| 2,623,331 | 12/1952 | Greening | 137—501 |
| 2,706,444 | 4/1955 | Chaplink | 99—282 |
| 2,742,764 | 4/1956 | St. Clair | 137—501 X |
| 2,807,144 | 9/1957 | St. Clair | 137—501 X |
| 2,839,988 | 6/1958 | Tritt | 99—307 |
| 2,909,191 | 10/1959 | Horton | 137—501 |
| 3,183,932 | 5/1965 | Karpus | 137—503 X |

M. CARY NELSON, *Primary Examiner.*

J. J. MILLER, *Assistant Examiner.*